United States Patent [19]
Ueda et al.

[11] 3,936,371
[45] Feb. 3, 1976

[54] METHOD FOR REMOVING VANADIUM, NICKEL, AND SULFUR FROM HYDROCARBON OILS

[75] Inventors: Shigeru Ueda; Yoshinori Nakata; Shinichi Yokoyama, all of Sapporo; Naoyuki Todo, Tachikawa; Yuji Yoshida, Sapporo; Tadao Ishii, Sapporo; Gen Takeya, Sapporo, all of Japan

[73] Assignee: Agency of Industrial Science & Technology, Tokyo, Japan

[22] Filed: Mar. 14, 1974

[21] Appl. No.: 451,160

[30] Foreign Application Priority Data
Mar. 30, 1973  Japan.................................. 48-36985

[52] U.S. Cl. ............ 208/251 H; 208/253; 208/295; 208/297; 208/248; 208/245; 208/260; 208/217
[51] Int. Cl.² .................. C10G 17/00; C10G 29/04
[58] Field of Search ....... 208/251 H, 253, 257, 295, 208/297, 260, 245, 248, 261

[56] References Cited
UNITED STATES PATENTS
2,019,184  10/1935  Gray et al. ........................... 208/245
2,134,824  11/1938  Hiatt .................................... 208/245
2,336,174  12/1943  Hewlett ............................... 208/248

FOREIGN PATENTS OR APPLICATIONS
767,122  1/1957  United Kingdom............. 208/251 H

OTHER PUBLICATIONS

"Chemical Refining of Petroleum" pp. 266–268 Kalichevsky et al. 1942.

Primary Examiner—Delbert E. Gantz
Assistant Examiner—Juanita M. Nelson
Attorney, Agent, or Firm—Oblon, Fisher, Spivak, McClelland & Maier

[57] ABSTRACT

A hydrocarbon oil, particularly a heavy hydrocarbon oil, containing vanadium, nickel, sulfur and asphaltenes is brought into contact with red mud at an elevated temperature in the presence of hydrogen. The treatment removes vanadium, nickel and asphaltenes from oil in high yields.

4 Claims, No Drawings

METHOD FOR REMOVING VANADIUM, NICKEL, AND SULFUR FROM HYDROCARBON OILS

BACKGROUND OF THE INVENTION

This invention is a highly effective method for removing vanadium, nickel, sulfur and asphaltenes from hydrocarbon oil, particularly heavy hydrocarbon oil.

Prior to usage of heavy oil, it is necessary to desulfurize the oil at low cost. Hitherto, desulfurization has been conducted by hydrodesulfurization. This system uses nickel, cobalt and molybdenum deposited on a silica-alumina carrier as the catalysts. Heavy oils contain metals such as vanadium and nickel and sulfur and asphaltene, etc. When such a heavy oil is hydrodesulfurized in the presence of said catalyst, vanadium, nickel and carbonaceous substances contained therein adhere to the catalyst and consequently block the functioning portion or the active site of the catalyst. Accordingly, the catalyst is gradually deprived of its activity, namely the ability to hydrodesulfurize the hydrocarbon oil. Particularly in the case of vanadium, it is well known the length of life of the catalyst is chiefly determined by the amount of this metal deposited on the catalyst. In this respect, methods for removing vanadium and nickel from heavy oil effectively in such a way that the life of the catalyst will be extended have been proposed. For example, Japanese Pat. Publication No. 20914/1971, discloses a method whereby heavy oil containing vanadium and nickel is brought into contact with a vanadium-impregnated activated alumina catalyst in the presence of hydrogen to remove said defiling metals from heavy oil. However, the production of the vanadium-impregnated activated alumina to be used in this method entails a complicated process.

SUMMARY OF THE INVENTION

In the present invention, hydrocarbon oil, particularly heavy hydrocarbon oil, is brought into contact with red mud at an elevated temperature in the presence of hydrogen. This treatment is highly efficient in removing vanadium, nickel, sulfur and asphaltene from hydrocarbon oil as well, if the oil is of a type containing such asphaltene. For this treatment, the temperature is required to fall in a range between 350° and 500°C and the hydrogen pressure in a range between 1 and 300 atmomspheres. The amount of the red mud to be used for the treatment is at least 1 percent by weight. The ability of the red mud to remove such defiling substances as vanadium, nickel and asphaltene is retained until the total of accumulated amounts of these defiling substances therein reach about 10 percent by weight.

The principal object of this invention is to provide a highly economic method for removing vanadium, nickel and asphaltene from hydrocarbon oil by use of red mud which occurs as a waste product in the production of alumina from bauxite.

DETAILED DESCRIPTION OF THE INVENTION

When hydrocarbon oil, particularly heavy hydrocarbon oil, containing vanadium, nickel and sulfur is brought into contact with red mud maintained at an elevated temperatures in the presence of hydrogen, the said metals are removed with an extremely high efficiency from the oil. This treatment removes asphaltene at a somewhat lesser rate if the oil also contains asphaltene.

Red mud is a residue which occurs when bauxite is dissolved at high temperatures to produce alumina as a raw material for the electrolytic production of aluminum.

The red mud in a dry form has a relatively large surface area (80 m²/g, for example). The principal components which make up the red mud vary with the type of bauxite from which it originates. A typical composition is 18 – 25 percent by weight of $Al_2O_3$, 15 – 20 percent by weight of $SiO_2$, 30 – 40 percent by weight of $Fe_2O_3$, 2 – 8 percent by weight of $TiO_2$, and 8 – 12 percent by weight of matter destined for ignition loss. The amount of red mud is substantially equal to that of the aluminum obtained in said production. Virtually no method has so far been proposed for effective utilization of red mud. Therefore, most of the red mud thus produced is discarded as useless into the sea.

The present inventors have found that in desulfurizing a hydrocarbon oil, particularly a heavy hydrocarbon oil, by the process of hydrodesulfurization carried out under ordinary conditions, use of otherwise wasteful red mud as a catalyst provides a highly effective removal of vanadium, nickel, sulfur and asphaltene. The present invention is accomplished on the basis of this discovery. To be more specific, when a heavy hydrocarbon oil containing vanadium and nickel is brought into contact with red mud at elevated temperatures in a range between 350° and 500°C in the presence of hydrogen pressure of from 1 to 300 atmospheres, the said vanadium, nickel and sulfur are removed from the oil with an extremely high efficiency. The removal is equally effected with respect to asphaltenes in the case of an oil containing such asphaltene.

When the reaction temperature falls short of the lower limit of the range, 350°C, the removal of vanadium and nickel is not accomplished with sufficiently high efficiency, making the operation impractical. When it exceeds 500°C the upper limit of the range, however, such undesirable secondary reactions as carbonization and dehydrogenation occur which seriously affect the efficiency of oil purification.

In the present invention, the presence of hydrogen in the reaction system is absolutely necessary. Although the magnitude of hydrogen pressure is dependent upon other factors of the reaction, any hydrogen pressure in excess of the upper limit of the range, 300 atmospheres, does not increase the ratio of removal of vanadium, nickel and asphaltenes. For practical purposes, therefore, the hydrogen pressure should not be increased beyond the upper limit.

In aluminum production, red mud discharged is generally in the form of slurry having a high water content. When the red mud is used as a catalyst in the reaction of this invention, therefore, it must be dehydrated and then prepared as in a granulated form, pellet form and powder form.

Hydrocarbon oils to which the method of this invention is applicable are not specifically limited. Generally, however, those oils which require removal of vanadium, nickel and sulfur are crude oil, topped heavy oil, heavy oil, asphalt, tar, sand oil, shale oil, etc. The present invention, therefore, is effective for the treatment of these oils.

Although the amount of red mud based on that of heavy oil is not definite but varies with the compositions of heavy oil and red mud or with the reaction conditions, it is generally required to be not less than 1 percent by weight at least. As described above, heavy oil containing vanadium, nickel and asphaltnes can be deprived of said defiling substances when the oil is brought into contact with red mud proposed as a catalyst in the presence of at elevated temperatures and hydrogen. Simultaneously, there ensues a desulfurization reaction which results in generation of hydrogen sulfide. The hydrogen sulfide acts on iron oxide, which is one of the components of red mud, and forms iron sulfide. This iron sulfide catalyzes the hydrogenolysis of the heavy oil.

Thus, this invention automatically effects the hydrogenolysis of heavy oil. Because of this automatic hydrogenolysis, the present invention, even in an operation involving desulfurization by destructive hydrogenation besides removal of vanadium, nickel, etc., does not require an addition of sulfur or other similar substance which are generally utilized effectively in hydrogenolysis. In any event, sulfur removal must be conducted later if the oil is to be purified. The fact that the hydrogenolysis is accomplished without requiring an addition of a substance which must be removed later is one of the advantages of the present invention.

If the treatment of heavy oil involves removal of vanadium, nickel, etc. and when hydrogenolysis is required, then it can satisfactorily be accomplished by use of red mud in which the iron oxide component has been converted in advance to iron sulfide by sulfurization using a mixed gas consisting of hydrogen sulfide and hydrogen.

The function of red mud to remove vanadium, nickel, sulfur and asphaltenes from such heavy oils continues until the total weight of vanadium, nickel and asphaltenes accumulated therein reaches about 10 percent by weight of the weight of the red mud itself.

While it is possible to purify hydrocarbon oil, particularly a heavy hydrocarbon oil, by desulfurization in addition to removal of vanadium, nickel, and asphaltene by use of red mud alone, the removal of such defiling components, however, is accomplished more effectively when the treatment using red mud is carried out in combination with the hitherto known desulfurization reaction. In other words, vanadium and nickel is removed in advance in the present invention and, thereafter, subjected to a desulfurization reaction using known, highly active catalysts of nickel, cobalt, molybdenum, etc. When the defiling substances are removed in advance from the heavy oil as described, the desulfurizing activity of the said expensive catalysts can be prolonged greatly.

The present invention makes it possible to provide highly effective removal of vanadium, nickel, sulfur and asphaltene from hydrocarbon oil, particularly heavy hydrocarbon oil, containing said defiling substances by use of red mud whose disposal has heretofore posed a serious pollution problem. Thus, this invention is advantageous from an economic point of view and, in this respect, lends itself greatly to the aluminum industry.

This invention will more easily be understood from the cases illustrated in examples 1 and 2. These examples provide a firm basis of this invention; however, the application is not limited to the examples cited here.

EXAMPLE 1

A 300-ml autoclave provided with an electromagnetic agitator was loaded with 50g of atmospheric distillation residue from Kuwait (4.4 percent by weight of sulfur, 49 ppm of vanadium and 11.4 ppm of nickel). To this was added 5g of red mud (composed of 13 percent $SiO_2$, 22 percent $Al_2O_3$, 8 percent $Na_2O$, 42 percent $Fe_2O_3$, 2 percent $TiO_2$ and 13 percent water) previously pelletized to an average particle size of 1mm and sulfurized with hydrogen sulfide and hydrogen at 370°C. The internal pressure of the loaded autoclave prepared for each run was charged to 100 kg/cm² with hydrogen gas, raised to the given temperatures indicated in Table 1 at a heating rate of 3°C/minute and thereafter maintained at the temperature required for the reaction for 60 minutes. The results are shown in Table 1. Analysis for sulfur content was performed by using a commercial apparatus "Coulomatic S" made by Kokusai Denki Co., Ltd. Tokyo. The analysis was carried out by the following procedure. The sulfur contained in a sample was converted with a high-frequency combustion device into sulfur dioxide and sulfur trioxide. Then the sulfur oxides were absorbed by an absorbent containing hydrogen peroxide having a prescribed hydrogen ion concentration. The resulting sulfuric acid in the above absorbent changes the original hydrogen ion concentration. Next an electric current is passed through the absorbent until the hydrogen ion concentration returns to the original value which existed prior to the passage of sulfur oxides. The amount of electric current thus passed was converted into pulses. The sulfur content was calculated from the indicated number of pulses. Analysis for vanadium content was performed by calcining a sample and subjecting the resultant ashes to spectroscopic determination in accordance with the standard adopted by the Japan Petroleum Society. Analysis for nickel content was carried out by use of an atomic absorption spectrophotometer.

Table 1

|  | Example according to this invention | | | | Comparative example | |
|---|---|---|---|---|---|---|
|  | Run No. 1 | Run No. 2 | Run No. 3 | Run No. 4 | Run No. 5 | Run No. 6 |
| Uncommon condition | 30g of residual oil | Red mud not sulfurized |  |  |  |  |
| Reaction conditions |  |  |  |  |  |  |
| Temperature (°C) | 440 | 400 | 400 | 380 | 340 | 300 |
| Pressure (kg/cm²) | 220 | 195–180 | 163–158 | 157–148 | 191–185 | 180 |
| Oil composition after reaction |  |  |  |  |  |  |
| $C_1$–$C_5$ (% by weight) | 9.2 | 3.6 | 3.4 | 1.9 | 0.3 | 0 |
| $C_5$–b.p. 300°C (% by weight) | 64.7 | 34.3 | 37.7 | 15.9 | 6.0 | 2.0 |
| Over b.p. 300°C (% by weight) | 26.1 | 62.1 | 58.9 | 82.2 | 93.7 | 98.0 |
| Hydrogen consumption(mol/kg) | 8.2 | 4.6 | 7.6 | 6.5 | 1.1 | 0.5 |

Table 1-continued

|  | Example according to this invention | | | | Comparative example | |
|---|---|---|---|---|---|---|
| Uncommon condition | Run No. 1 30g of residual oil | Run No. 2 Red mud not sulfurized | Run No. 3 | Run No. 4 | Run No. 5 | Run No. 6 |
| Ratio of desulfurization (%) | 54 | 33 | 30 | 26 | 25 | 0 |
| Ratio of vanadium removal (%) | 89 | 94 | 90 | 78 | 19 | 0 |
| Ratio of nickel removal (%) | 86 | 88 | 87 | 84 | 60 | 0 |

From the above Table, it may clearly be seen that the amount of hydrogen consumption and the contents of light oil together with the ratios of removal of vanadium and nickel are heightened in proportion to the increase of reaction temperature.

As is evident from the data of the example according to this invention and examples, listed for comparison it is essential that the reaction temperature should be not less than 350°C.

EXAMPLE 2

The autoclave of Example 1 was charged with 50g of vacuum distillation residue of Gach Saran (3.6 percent sulfur, 339 ppm vanadium, 106 ppm nickel and 10.2 percent asphaltenes) and red mud (having the same composition as that of Example 1) which was previously pelletized to an average particle size of 1mm and sulfurized at 370°C with hydrogen sulfide and hydrogen. The content of the autoclave was charged to 100 kg/cm² with hydrogen and subjected to the treatment by repeating the procedure described in Example 1.

The results are shown in Table 2. Methods of analyses were the same as described in Example 1.

It is clear from the foregoing working examples and examples for comparison that effective removal of vanadium, nickel, sulfur and asphaltenes can be obtained by performing the reaction at temperatures of not less than 350°C.

What is claimed is:

1. A method for removing vanadium, nickel, sulfur and asphaltenes from hydrocarbon oils comprising contacting said hydrocarbon oil with red mud having from 18 – 25% by wt. aluminum oxide, 15 – 20% by wt. silicon dioxide, 30 – 40% by wt. ferric oxide, 2 – 8% by wt. titanium dioxide, and 8 – 12% by wt. of matter that is lost by ignition, at elevated temperatures and in the presence of hydrogen.

2. A method according to claim 1, wherein the hydrocarbon oil is at least one member selected from the group consisting of crude oil, topped crude oil, heavy oil, asphalt, tar, sand oil and shale oil.

3. A method according to claim 1, wherein the elevated temperature falls in a range between 350° and 500°C.

4. A method according to claim 1, wherein the amount of red mud is at least 1 percent by weight based on hydrocarbon oil.

* * * * *

Table 2

| Uncommon condition | Example according to this invention | | | | Comparative example | |
|---|---|---|---|---|---|---|
| | Run No. 1 | Run No. 2 | Run No. 3 Red mud not sulfurized | Run No. 4 red mud not sulfurized | Run No. 5 | Run No. 6 |
| Reaction conditions | | | | | | |
| Temperature (°C) | 400 | 400 | 400 | 400 | 340 | 300 |
| Pressure (kg/cm²) | 154–129 | 155–138 | 161–138 | 203–172 | 190–185 | 180 |
| Time (minute) | 60 | 30 | 60 | 60 | 60 | 60 |
| Oil composition after reaction | | | | | | |
| $C_1$–$C_5$(% by weight) | 4.5 | 3.6 | 4.8 | 4.8 | 0.2 | 0 |
| $C_5$–b.p. 300°C (% by weight) | 34.4 | 34.8 | 29.2 | 43.1 | 5.0 | 0 |
| Over b.p. 300°C (% by weight) | 61.1 | 61.6 | 66.0 | 52.1 | 94.8 | 100 |
| Hydrogen consumption (mol/kg) | 5.9 | 4.7 | 6.1 | 6.3 | 1.0 | 0 |
| Ratio of desulfurization (%) | 47 | 44 | 47 | 47 | 25 | 0 |
| Ratio of vanadium removal (%) | 85 | 86 | 81 | 91 | 20 | 0 |
| Ratio of nickel removal (%) | 84 | 67 | 77 | 74 | 50 | 0 |
| Ratio of asphaltenes removal (%) | 49 | 48 | 42 | 43 | 10 | 0 |